(12) United States Patent
Rasmusson et al.

(10) Patent No.: US 9,111,328 B2
(45) Date of Patent: Aug. 18, 2015

(54) TEXTURE COMPRESSION AND DECOMPRESSION

(75) Inventors: Jim Rasmusson, Vellinge (SE); Michael Doggett, Lund (SE); Jacob Ström, Stockholm (SE); Per Wennersten, Årsta (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 490 days.

(21) Appl. No.: 13/640,203

(22) PCT Filed: Feb. 9, 2011

(86) PCT No.: PCT/SE2011/050145
§ 371 (c)(1),
(2), (4) Date: Oct. 9, 2012

(87) PCT Pub. No.: WO2011/126424
PCT Pub. Date: Oct. 13, 2011

(65) Prior Publication Data
US 2013/0033513 A1 Feb. 7, 2013

Related U.S. Application Data

(60) Provisional application No. 61/282,831, filed on Apr. 7, 2010.

(51) Int. Cl.
*G06T 11/40* (2006.01)
*G06T 9/00* (2006.01)

(52) U.S. Cl.
CPC ........................................ *G06T 9/00* (2013.01)

(58) Field of Classification Search
None
See application file for complete search history.

(56) References Cited

U.S. PATENT DOCUMENTS

| | | |
|---|---|---|
| 7,171,051 B1 | 1/2007 | Moreton et al. |
| 2008/0055331 A1 | 3/2008 | Iourcha et al. |

(Continued)

FOREIGN PATENT DOCUMENTS

| | | |
|---|---|---|
| EP | 1445734 | 8/2004 |
| WO | WO 2010/147529 | 12/2010 |

OTHER PUBLICATIONS

International Search Report for PCT/SE2011/050145 mailed Sep. 14, 2011.

(Continued)

*Primary Examiner* — Phi Hoang
*Assistant Examiner* — Mohammad H Akhavannik
(74) *Attorney, Agent, or Firm* — Baker Botts, LLP

(57) ABSTRACT

Embodiments relate to compression and decompression of textures. A texel block (10) is compressed by specifying two major directions in the texel block (10) and defining the profiles of how the texel values change along the respective directions. The resulting compressed texel block (30) comprises two value codewords (31, 32), two line codewords (35-38) and a function codeword (33, 34). The two value codewords (31, 32) are employed to calculate two texel values for the texel block (10). The line codewords (35-38) are employed to determine equations of two lines (20, 22) coinciding with the two major directions in the texel block (10). Signed distances are calculated for each texel (12) from the texel position in the texel block (10) and to the two lines (20, 22). The signed distances are input to a function defined by the function codeword (33, 34) to output two values from which weights are calculated and applied to the two texel values in order to get a representation of the texel value of a texel (12).

24 Claims, 10 Drawing Sheets

(56) References Cited

U.S. PATENT DOCUMENTS

2009/0003692 A1* 1/2009 Pettersson et al. ............ 382/166
2009/0021521 A1 1/2009 Sorgard et al.
2009/0304298 A1* 12/2009 Lu et al. ........................ 382/251

OTHER PUBLICATIONS

J. Rasmusson et al., "Texture Compression of Light Maps Using Smooth Profile Functions", Author Made Version-To Appear in High Performance Graphics 2010, retrieved May 9, 2011, 10 pages.

* cited by examiner

TEXTURE COMPRESSION AND DECOMPRESSION

This application is the U.S. national phase of International Application No. PCT/SE2011/050145 filed 9 Feb. 2011 which designated the U.S. and claims priority to U.S. Provisional Application No. 61/282,831 filed 7 Apr. 2010, the entire contents of each of which are hereby incorporated by reference.

TECHNICAL FIELD

The present invention generally relates to compression and decompression, and in particular to compression and decompression of textures.

BACKGROUND

When attempting to increase performance for Graphics Processing Units (GPUs), one important method is applying various techniques to reduce memory bandwidth consumption, i.e. the bandwidth required between the memory and the GPU. The importance of bandwidth reduction is also becoming increasingly important as the performance growth rate for processing power is much larger than performance growth for bandwidth and latency for Random Access Memories (RAMs).

Although it is sometimes possible to trade computations for memory accesses, for example by computing the value of functions rather than accessing pre-computed lookup-tables, it is likely that at some point the computation needs are satisfied, leaving the GPU idly waiting for memory access requests. Additionally, a brute force approach of simply duplicating memory banks and increasing the number of pins on memory chips may not be feasible in the long run. Finally, transferring data between the GPU and the RAM consumes large amounts of power, which is a problem, especially in mobile applications. Because of that memory bandwidth reduction algorithms are an important area of future research.

One type of images used in graphics applications is referred to as textures. A texture is just a regular image that is used to represent the surface of a graphics primitive such as a triangle, or a quadrilateral (quad). Since a texture is a type of image, it consists of pixels. However, since the final rendered image also consists of pixels, it is common to use the name "texel" for an image element or texture element in the texture. In order to draw a pixel in the rendered image, one must first work out where in the texture this corresponds to. Often however, the pixel will not correspond exactly to a texel in the texture, but will fall somewhere in between four texels. Then, bilinear filtering is usually done between these four texels to produce the pixel. This is referred to in the literature as texture mapping using bilinear filtering. Another complication is that the resolution of the rendered image may be different from the resolution of the texture. For instance, a portion of a rendered image may occupy 100×100 pixels whereas the matching texture may have the size of 512×512 texels. Rendering from such a big texture may produce antialiasing artifacts. Therefore, a preprocessing step is typically averaging and subsampling the texture to a set of resolutions, for instance 256×256, 128×128, 64×64, 32×32 16×16, 8×8, 4×4, 2×2 and 1×1 texels. These levels are often called mipmap levels, with the 512×512-version being the highest resolution mipmap level and the 1×1-version being the lowest resolution mipmap level. The two closest mipmap levels are then used. If it is again assumed that the portion in the rendered image occupies 100×100 pixels, the GPU will use the mipmap levels of 128×128 texels and 64×64 texels. In each of these, the GPU will calculate the nearest four texels, combine them bilinearly, and then combine the two resulting values linearly. This is referred to in the literature as trilinear mipmapping. As should be clear from the above, this means that up to eight texels may have to be processed in order to produce one rendered pixel.

Texture compression is one popular way of reducing bandwidth requirements. By storing textures in compressed form in memory and transferring blocks of this compressed data over the bus, texture bandwidth is substantially reduced.

A light map is a common type of texture. A light map is a texture applied to an object to simulate the distance-related attenuation of a local light source. For instance computer games use light maps to simulate effects of local light sources, both stationary and moving.

Traditionally, light maps have been used to model slowly varying lighting behavior in an economical way. A typical example has been a textured brick wall. If only one texture is used, the texture has to be of very high resolution in order to reproduce the details of individual bricks. To avoid big textures an obvious trick is to repeat the brick pattern, which means that the brick texture can be small and still of high resolution with respect to the screen resolution. The drawback is that the brick wall then has to be exactly the same—a brick in the top left part of the wall must be represented by the same texels as a brick in the lower right corner. The lighting will thus be uniform across the entire wall, which often looks unrealistic.

Light maps were created to get around this problem. Two textures were used: one small, repeated texture of high resolution, and one small, non-repeated of lower resolution. The final texel with which to color the rendered pixel can then be calculated using a formula such as:

$$\text{final\_color}(x,y) = \text{brick\_texture}(x + i \times N, y + j \times M) \times \text{light\_map\_texture}\_(x/S, y/T)$$

where the brick_texture is the repeated texture and lightmap_texture is a low-resolution texture. Here i is selected so that x+i×N is never bigger than N−1 and never smaller than 0 (sometimes by using negatively valued i). Likewise, j is selected so that y+j×M is between 0 and M−1. This way, both brick_texture and lightmap_texture could be small and thus require little bandwidth during rendering. The reason this works is due to the fact that the changes in lighting of the light maps usually are rather slow, and lowering the resolution is therefore acceptable.

Early light maps were scalar valued, i.e. they contained only an intensity value in each texel that decreased the intensity of the other texture. Soon came colored light maps, where each texel contained an RGB (Red-Green-Blue)-tuple, and so were able to simulate colored light.

Recent developments have increased the photo-realism of light maps by describing the incoming light in three different directions. Hence, instead of just storing a single RGB-tuple in the texel, which describes the average (colored) lighting hitting a particular point on the texture, three RGB-tuples are stored. Each RGB-tuple now describes the light that shines on a particular point from a particular direction. Together with a normal-map, which describes the normal in the particular point, the fragment shader can then calculate which of these three light directions are most relevant and compute the fragment (pixel) color accordingly. With an additional trick, even texture self-shadowing is possible.

Whereas these recent developments increase photorealism, they also demand three times the storage and bandwidth, since three RGB-tuples are stored instead of one. Moreover, many applications demand high dynamic range data (floats or halfs instead of integers), further increasing the burden of bandwidth and storage. Therefore, light maps are increasingly compressed using texture compression methods, such as DXT1 as disclosed in U.S. Pat. No. 5,956,431. DXT1 is a texture compression method which converts a 4×4 block of pixels to 64-bits, resulting in a compression ratio of 6:1 with 24-bit RGB input data. DXT1 is a lossy compression algorithm, resulting in image quality degradation, an effect which is minimized by the ability to increase texture resolutions while maintaining the same memory requirements (or even lowering it).

While DXT1-compression usually gives quite good image quality for regular textures, there are cases where DXT1 does not do a very good job. The most important one is perhaps slow transitions between two colors. Since DXT1 cannot have more than four different colors per 4×4 block, it is impossible to create very smooth ramps between colors. The result will be "grainy" or "dirty"-looking transitions.

There is therefore still a need for texture compression and decompression systems and in particular such systems that are adapted for handling light maps and textures, where DXT1 is not advantageous.

SUMMARY

It is an objective to provide a compression and decompression of texel blocks.

Briefly, a compression of a texel block comprising multiple texels having respective texel values involves determining, preferably based on at least a portion of the texel values, a first value codeword representing a first texel value and a second value codeword representing a second texel value. Two directions are defined for the texel block based on at least a portion of the texel values. A first line codeword that is a representation of the equation of the line for the first direction is determined as is a corresponding second line codeword that is a representation of the equation of the line for the second direction. Furthermore, a function codeword is determined that is a representation of a function that varies in two dimensions and preferably reflects the change or trend in texel values when traveling along the first and second directions in the texel block. The determined value codewords, line codewords and function codeword are stored together as a compressed texel block.

During decompression the first and second texel values are determined from the first and second value codewords, respectively. The line codewords are employed for defining the respective line equations and the function codeword allows identification of the function varying in two dimensions. A texel is decoded by determining respective signed distances between the position of the texel in the texel block and two lines defined by the line codewords. The signed distances are input to the function in order to get respective rescaled values from which a combined value is calculated. This combined value is employed for defining weights associated with the texel and applied to the first and second values in order to calculate a texel value representation for the texel.

Embodiments also relate to an encoder having a processor configured to determine the first and second value codewords, the first and second line codewords and the function codeword for a texel block to be compressed and a memory configured to store the determined codewords. A decoder is also disclosed that uses the line and function codewords of the compressed texel block to calculate respective weights for texels in the texel block. These weights are employed together with the first and second value determined by the decoder to calculate respective texel value representations for the texels.

BRIEF DESCRIPTION OF THE DRAWINGS

The invention, together with further objects and advantages thereof, may best be understood by making reference to the following description taken together with the accompanying drawings, in which.

DETAILED DESCRIPTION

Throughout the drawings, the same reference numbers are used for similar or corresponding elements.

The present embodiments are configured to enable compression and decompression of textures and in particular textures in the form of so-called light maps or lightmaps. These textures are generally three dimensional (3D) engine light data structure which contains the brightness of a surface in 3D graphics, such as games, 3D maps and scenes, 3D messages, e.g. animated messages, screen savers, man-machine interfaces (MMIs), etc. However, the embodiments could also be employed for compression and decompression other types of images or graphics, e.g. one-dimensional (1D), two-dimensional (2D) or 3D images.

Figure 1:
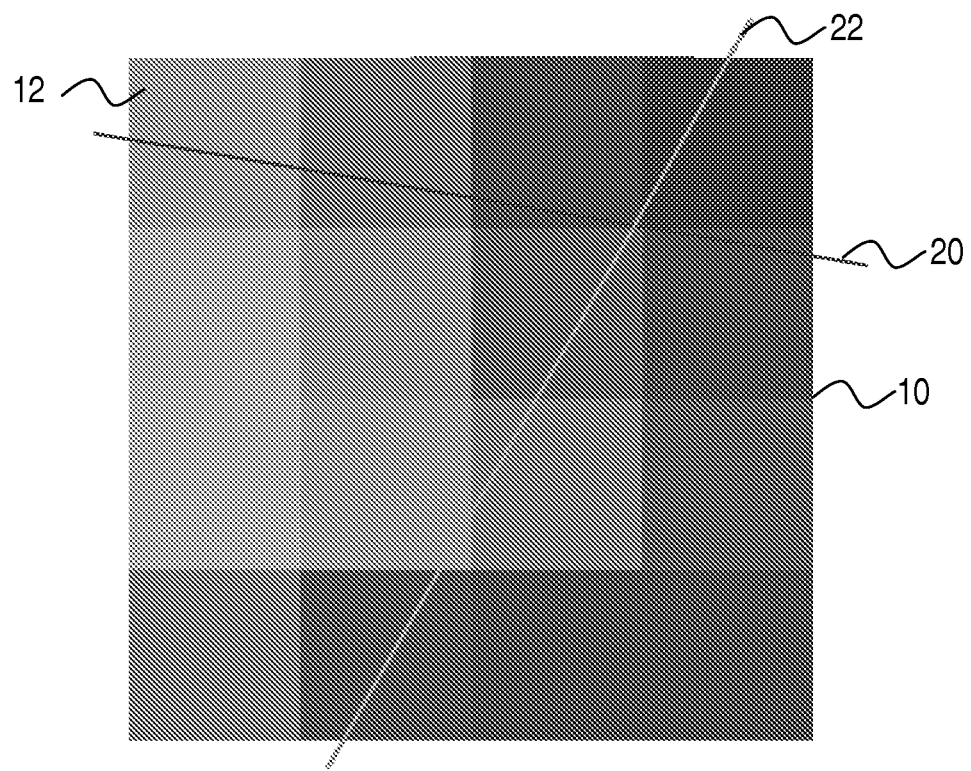
FIG. 1 is a drawing illustrating a texel block of texels with two marked major directions in changing texel values.

The embodiments are particularly suitable for handling texture blocks in a light map or texture having two main or major directions representing information in texel data when traveling along the respective directions. FIG. 1 is a schematic illustration of a texel block 10 from a texture, such as a light map. The figure illustrates the texel block 10 as a 4×4 block of texels 12 or pixels. Each texel 12 has at least one texel value, such as a single intensity value, but preferably a RGB-tuple or multiple RGB-tuples.

The figure also comprises two major directions marked with the two lines 20, 22 extending over the texel block 10.

In the art, textures are divided into so-called texel blocks, each comprising a number of texels. Such a texel block is typically rectangular or quadratic, such as a size of $M_R \times M_C$ texels, where $M_R$, $M_C$ are positive integer numbers with the proviso that both $M_R$ and $M_C$ are not simultaneously one. Preferably, $M_R=2^{m_R}$ and $M_C=2^{m_C}$, where $m_R$, $m_C$ are positive integers. In a typical implementation $M_R=M_C$ and preferred such block embodiments could be 4×4 texels.

In the art, pixel or image element is sometimes employed to denote a texture element of a texture. In the following description, texel is, though, employed to denote a texture element of a texture and pixel is used to denote a picture element generated from such texels in connection with rasterization.

Compression

The compression of a texel block involves determining a number of parameters or codewords that are employed as coded representation of the texel block and its texel values. In addition, the total size of these parameters in terms of number of bits should meet the preferably fixed bit budget assigned to each compressed or encoded texel block and should be smaller than the size of the original uncoded texel values of the texel block.

Hence, according to an embodiment a texel block is encoded by dividing the image or texture into a plurality of texel blocks, wherein each texel block comprises a number of image elements such as texels and each texel has a value, e.g. a gray scale value or a color value represented by a tripule of RGB components. Note here that texel values are not necessarily colors. It is also possible that a texel represents a gray value, a normal vector or in principle any kind of information that can be used during rendering and that is amenable to the type of compression described herein. With the advent of general purpose GPU-programming, it is even possible that the information will not be used for rendering, but for general purpose computation.

Figure 6:
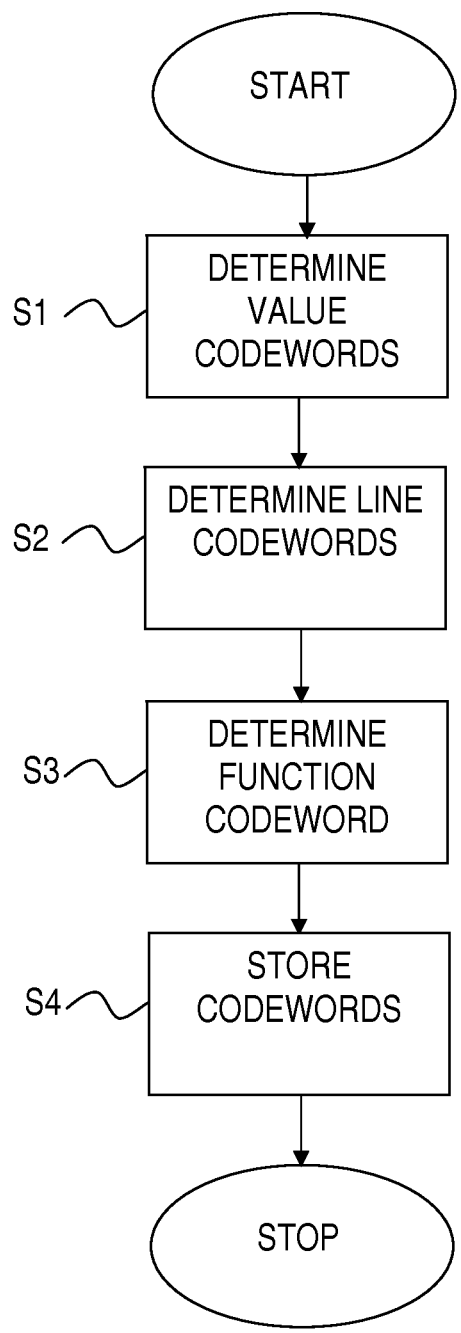
FIG. 6 is a flow diagram illustrating a compression method according to an embodiment.

Furthermore and with reference to FIG. 6, a first and a second codeword are determined for the texel block in step S1. The two codewords represent texel values of the texels in the texel block. Thus, the codewords can be two color codewords or two grayscale codewords, depending on the characteristic texel values of the texel block. These two codewords are preferably determined from at least a portion of the original texel values of the texel block. In a particular embodiment, each codeword is a color codeword comprising a respective red color component, a green color component and a blue color component.

The compression also comprises determining a first major direction and a second major direction for the texel block. In a preferred embodiment, the two directions can be selected freely and are not forced to be orthogonal to each other or have some other pre-defined relationship. In a particular embodiment, the first direction is selected so that the texel values vary more along the first direction than any other direction in the texel block. The second direction is then typically selected to be the direction where the texel values vary most after subtraction of the function or equation for the first direction. FIG. 1 illustrates this concept with a texel block 10 having two major directions represented by two straight lines 20, 22 in the figure together with a marked texel 12.

The compression method then involves determining respective line codewords or direction codewords representing the two major directions in the texel block in step S2. A line codeword comprises the parameters required to represent a line, such as $A_ix+B_iy+C_i=0$, where $A_i$, $B_i$, $C_i$ are the parameters for line representation i. Mathematically, this can be done by fitting a line $A_ix+B_iy+C_i=0$ to the respective directions, where the x-axis is aligned with or placed along the lower edge of the block and the y-axis is aligned with or placed along the left edge of the block. By normalizing the equation so that $A_i^2+B_i^2=1$, it is possible to get the benefit of easily being able to calculate the distance from any point $(p_x,p_y)$ to the respective line. The distance can then be defined as $d_1(x,y)=d_1(p_x,p_y)=A_ip_x+B_ip_y+C_i$. This distance is signed so that it is negative on one side of the line and positive on the other.

The texel block comprises two major directions and therefore has two sets of determined line parameters, where each set defines a line equation. The line parameters can include the parameters $A_i$, $B_i$, $C_i$ per line. However, in a preferred embodiment the line parameters instead comprises an angle codeword or parameter $\alpha_i$ that is a representation of the angle of the line relative a fixed direction or axis, such as the horizontal axis, and a translation codeword or parameter $C_i$. The parameters $A_i$, $B_i$ of the line equation can then be calculated from the angle parameter as: $A_i=\cos(\alpha_i)$ and $B_i=\sin(\alpha_i)$. This means that the first and second line codewords preferably each comprise a respective angle codeword and a translation codeword.

According to embodiments, the texel block is associated with a function that properly models the variation in texel values along the two major directions in the block. The two major directions can preferably be defined with arbitrary rotation angles between them. In order to reduce the number of bits spent on representing a compressed texel block, the function is preferably a symmetric single smooth-step function. However, each major direction preferably has its separate profile in terms of separate width, rotation angle and translation in order to improve the quality and performance of the compression and decompression system.

Figure 2:
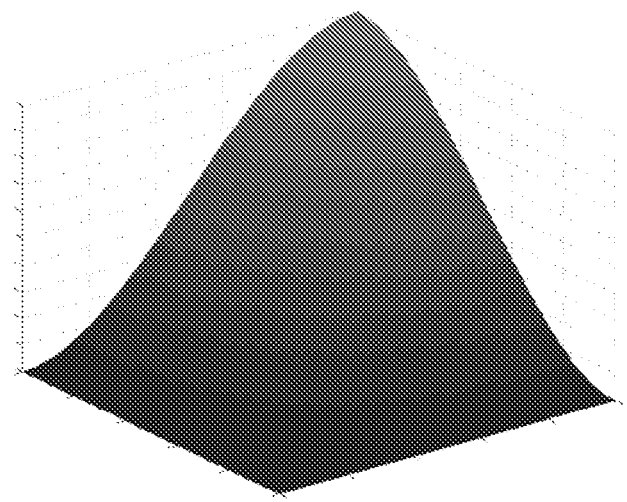
FIG. 2 schematically illustrates a function varying in two dimensions that can be used to determine value weights according to an embodiment.

The compression method therefore further involves determining, in step S3, a function codeword that is a representation of a function that can vary in two directions and which is employed to define the respective weights or interpolation values for the texels in the block. FIG. 2 schematically illustrates a non-limiting example of such a function.

Figure 3:
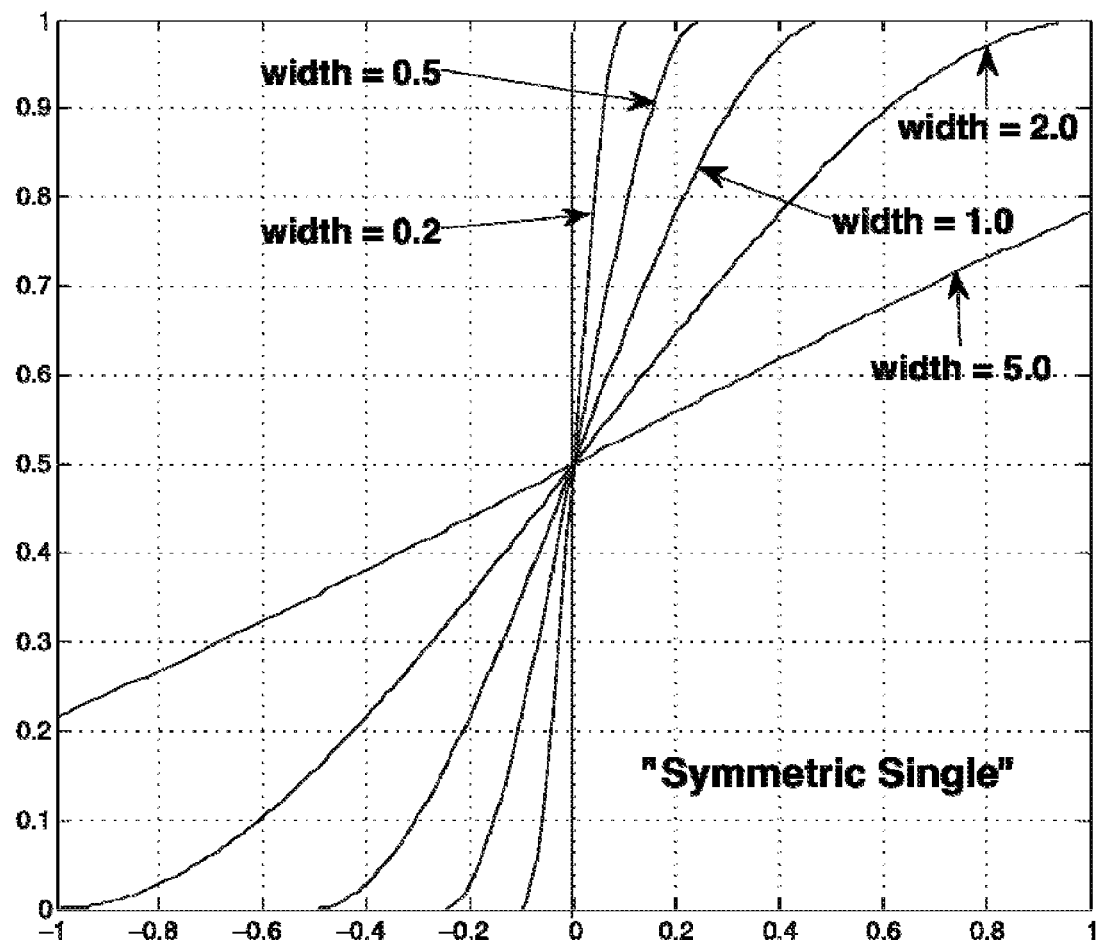
FIG. 3 is a drawing illustrating a set of single symmetric smooth-step functions with different width parameters.

In a particular embodiment, the function varying in two dimensions is obtained from two functions varying only in one dimension and preferably from two symmetric single smooth-step functions. One such function can then be determined for each of the major directions. This allows a separate width determination for each function. FIG. 3 illustrates the concept of symmetric single smooth-step functions with different widths. Symmetric single smooth-step functions are preferred examples of functions varying in one direction that can be used according to the embodiments. The advantage with this particular type of function is that the function can be defined solely based on the width for the function, thereby achieving a bit-efficient representation of the function. The function codeword therefore comprises the width parameter $\varpi_i$ for each of the two major directions.

The functions as shown in FIG. 3 can be defined as $f_i(d)=3s^2-2s^3$, where $$s = \frac{d}{\varpi_i} + 0.5$$

with the proviso that if (s<0) then s=0 and if (s>1) then s=1.

Symmetric single smooth-step functions should merely be seen as a non-limiting example of scalar-valued functions that can be used according to the invention. Other non-limiting examples include the arctan function or asymmetric single smooth-step functions.

The functions are then used during decompression or decoding in order to obtain the texel-specific weights or interpolation values needed to compute the representations of the values for the different texels in the texel block. Briefly, two values are determined for each texel in the texel block value$_i$=$f_i$(d$_1$(x,y))=$f_i$(A$_i$x+B$_i$y+C$_i$), where (x,y) denotes the coordinates of the texel in the texel block, such as ranging from (0,0) to (3,3), $f_i$( ) denotes the (symmetric single smooth-step) function having width equal to 0, and where i=1, 2.

A combined value that varies in two dimensions is then obtained by multiplying the two values together value_combined(x,y)=value$_1$(x,y)×value$_2$(x,y). In an alternative embodiment, the combined value is determined as the average of the two values:

$$\text{value\_combined}(x, y) = \frac{value_1(x, y) + value_2(x, y)}{2}.$$

This combined value then defines the weights or interpolation values for the texel at texel coordinate (x,y). In a preferred embodiment, the sum of the weights for a texel is equal to one so that one weight is calculated from the other weight: w$_1$(x,y)=1−w$_2$(x,y). In addition, the same set of weights is preferably used for all three color components in the case of an RGB texel value:

red_value(x,y)=w$_1$(x,y)×R$_1$+w$_2$(x,y)×R$_2$ green_value(x,y)=w$_1$(x,y)×G$_1$+w$_2$(x,y)×G$_2$ blue_value(x,y)=w$_1$(x,y)×B$_1$+w$_2$(x,y)×B$_2$ wherein R$_1$, G$_1$, B$_1$ are the red, green and blue components of the first value codeword and R$_2$, G$_2$, B$_2$ are the corresponding components of the second value codeword.

In a preferred embodiment w$_2$(x,y)=value_combined(x,y) and w$_1$(x,y)=1−value_combined(x,y).

The result of the compression method is a compressed texel block comprising the first and second codewords, preferably R$_1$, G$_1$, B$_1$ and R$_2$, G$_2$, B$_2$; the first and second line codewords, preferably the angle parameters α$_1$ and α$_2$ and the translation parameters C$_1$ and C$_2$; and the function codeword, preferably the width parameters $\overline{\omega}_1$ and $\overline{\omega}_2$. The codewords are preferably stored in a memory in step S4 and employed as compressed representation of the texel block, i.e. as a compressed texel block.

The particular values for these parameters and codewords can be performed based on an exhaustive search. In such a case, each possible value of the respective parameter is tested and the one that results in the best results in terms of minimizing the difference between the original texel values and the texel value representations obtained following compression and decompression with tested parameter values is selected and employed as codewords and parameters. Texel block compression is generally conducted off-line and does not have the same demands of (low) processing complexity and time as decompression.

FIG. 6 summarizes an embodiment of the compression method. The method starts by determining a first and second value codeword for the texel block to be compressed, such as a first and a second color codeword, in step S1. Two major directions are then determined and the (color or grayscale) values vary from the value represented by the first codeword to the value represented by the second codeword when moving along the respective lines. The two directions are defined by respective line or direction representations or codewords in step S2, preferably a respective angle parameter and a respective translation parameter. The method also involves determining, in step S3, parameters of a scalar valued function for defining the weights or interpolation values between the values represented by the two value codewords. The function is preferably defined by a function codeword, which may be the widths of two single symmetric smooth-step functions. The result of the compression is, thus, the value codewords, the line codewords and the function codeword, which together constitute, in this embodiment, the compressed texel block. This compressed texel block is preferably stored in step S4 in a memory.

Figure 4:
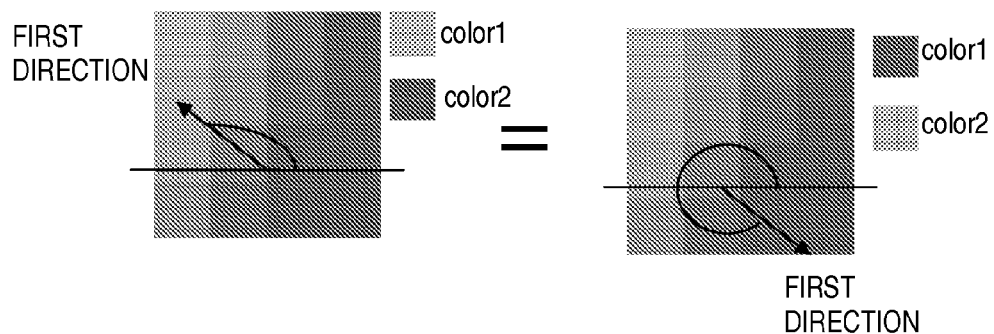
FIG. 4 schematically illustrates the concept of modifying angles together with value codeword swapping.

The preferred angle parameters employed as line representations together with the translation parameters can be defined in the interval [0, 360] degrees. However, it is actually possible to reduce this interval so that angles are only representable in the interval [0, 180] degrees. For example, an angle of 315 degrees as illustrated in the right part of FIG. 4 can be specified with an angle of 315−180=135 degrees with swapped value codewords, see the left part of FIG. 4. This means that an angle in the range [180, 360] degrees as in the right part of the figure can be simulated as an angle in the range [0, 180] degrees if the values of the two value codewords are swapped.

This concept can be used in order to reduce the number of bits that have to be spent on the angle parameters. For instance, instead of using 7 bits to specify an angle between [0, 360] degrees, it is possible to specify an angle of [0, 180] degrees using only 6 bits but still have the same level of angle accuracy:

$$\frac{360}{2^7} = \frac{180}{2^6} = 2.8125.$$

The step size of 2.8125 degrees is therefore kept but with the saving of one bit per angle parameter.

This has the added benefit that the angles are always smaller than 180 degrees. One step in the decompression is to produce the sin and cos-values of the angle. In hardware, this is often done using expensive look-up tables (LUTs). However, a normal LUT for the sin( ) function would typically need to store the sin-value for all angles from 0 to 360. However, the bit-saving 180-degree trick presented above implies that the angle is always between 0 and 180 degrees. The size of the LUT can therefore be reduced by half as compared to representing values for the full range of [0, 360] degrees.

Swapping value codewords is, however, generally not preferred with the embodiment where the combined value is calculated as the product of the two values. For instance, assume that the first signed distance d$_1$(x,y)=−0.6. Next the parameter $$s = \frac{d}{\varpi_1} + 0.5$$

is calculated, which in this case becomes 0.2 assuming a width $\overline{\omega}_1$=2. Finally value$_1$(x,y)=$f_1$(d$_1$(x,y))=3s$^2$−2s$^3$ is calculated to give the function output of 0.104. Further assume that the second signed distance d$_2$(x,y)=−0.6, which gives a function output of 0.104 if the width of the second function also is 2. Multiplying these two values together gives combined_value(x,y)=0.010816. Further assume that the first value codeword represents the color blue and the second value codeword represents the color pink. As a consequence, the first weight will be 1−0.010816=0.9899184, that is close to one and the second weight is 0.010816, which is close to zero. The color representation for the texel will therefore be close to blue. If the swapping concept would have been applied to this embodiment, the signed distance would instead be $d_1(x,y)=0.6$, which corresponds to a s-parameter of 0.8 and a function output of 0.896. The combined value will then be $0.896 \times 0.896 = 0.802816$. The weights are therefore 0.197184 and 0.802816, respectively. However, in this case the color representation for the texel will not be close to blue but rather somewhere in between blue and pink.

However, if the combined value is instead calculated as the average of the two values swapping is indeed possible. Thus, in that case the combined value before swapping will be 0.104 with the first weight equal to 0.896 and the first color equal to blue and the second weight equal to 0.104 and the second color being pink. Conducting the swapping, the combined value will instead be 0.896 with the first weight equal to 0.104 and the first color equal to pink and the second weight equal to 0.896 and the second color being blue. Thus, the same result is achieved and swapping is possible to signal one bit.

In the case with two major directions per texel block there are two angles that are preferably forced into the interval [0, 180] degrees. However, in such a case there are some constellations that cannot be reached. For instance, consider the first angle $\alpha_1$: If $\alpha_1=0$ the associated line equation will have a positive signed distance in the right half plane and negative in the left half plane, see leftmost diagram in FIG. 5.

Figure 5:
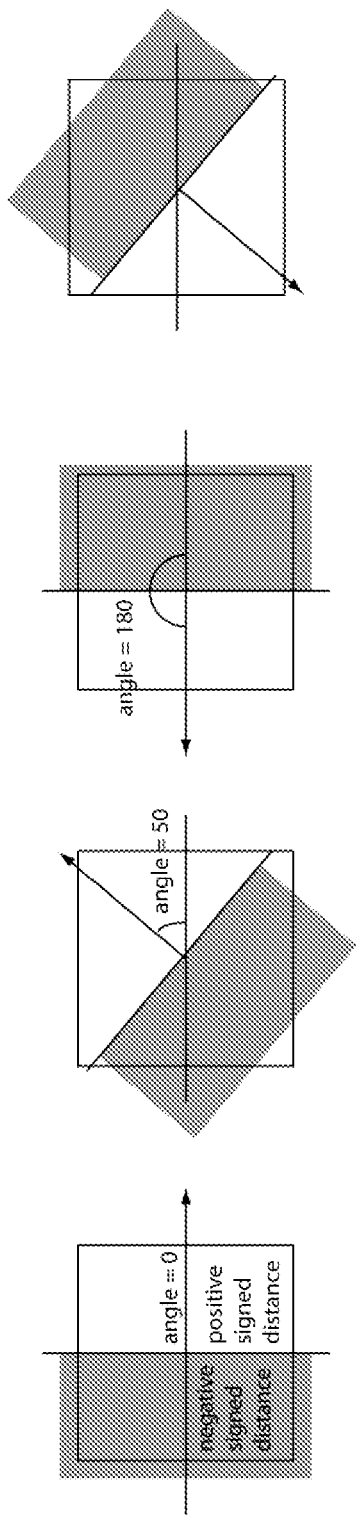
FIG. 5 schematically illustrates the limitation of using angles in the range of 0 to 180 degrees.

By going from $\alpha_1=0$ to $\alpha_1=180$ the negative half plane will end up as shown in the second right diagram in FIG. 5. However, the negative half-plane will never end up in the top half, as illustrated in the rightmost diagram in FIG. 5. For this, we would need an angle greater than 180. In the case where we only have one major direction in the texel block, this is acceptable, since the two value codewords are simply swapped. However, when the texel block has two major directions, this is no longer possible.

This problem is solved according to an embodiment by specifying an extra bit per angle to tell whether the negative half plane should be flipped or not. This means that it is still possible to use the same LUTs for sin and cos that go only between 0 and 180 degrees. Now, if the flip bit is set for the first or second direction, we exchange the value $value_i(x,y)=1-value_i(x,y)$.

The compression method therefore preferably comprises, in an embodiment, the investigation of whether any angle parameter $\alpha_1$ and $\alpha_2$ determined for the texel block is in the range [180, 360] degrees. In such a case, the angle value is updated to be equal to $\alpha_i-180$ and the flip bit associated with the angle parameter is set to one. If an angle parameter has an angle value that instead is within the range [0, 180] degrees, the associated flip bit is set to zero.

In an alternative approach, an ordering trick is employed. This approach is discussed in connection with FIG. 12. In this figure only eight possible angles are indicated in order to simplify the figure. These angles correspond to 0, 45, 90, 135, 225, 270 and 315 degrees. Each angle is further indicated with a number ranging from 0-7. The angles for the first direction are indicated along the x-axis and the angles for the second direction are found along the y-axis. In similarity to FIG. 5, positive signed distances are marked in white with negative signed distances marked in gray.

It is evident from the figure that the same distributions of positive and negative signed distances are found above the marked diagonal as under the marked diagonal. This means only the distributions above or below the diagonal need to be used thereby saving one bit. Thus, the number assigned to the first angle can thereby be forced to be larger than the number assigned to the second angle to guarantee that only the distributions above the diagonal are used. However, by switching place of the code for the first angle and the code for the second angle in the compressed texel block we can signal one bit. Thus, if the bit code of the texel block at the position assigned for the first angle codeword is larger than the bit code of the texel block at the position assigned for the second angle codeword this signals $0_{bin}$ (or alternatively $1_{bin}$). If, however, the bit code of the texel block at the position assigned for the first angle codeword is smaller than the bit code of the texel block at the position assigned for the second angle codeword this instead signals $1_{bin}$ (or alternative $0_{bin}$). During decompression the two bit codes are then once more switched back so that a distribution falling above the diagonal is obtained. The switching is therefore only conducted in order to signal $0_{bin}$ or $1_{bin}$.

An alternative approach uses the fact that the angles for the angles denoted 4-7 in the figure are the same as the angles denoted 0-3 but with different sign. This means that it is always possible to signal a number between 0-3 and using a separate bit to indicate whether the angle should be negated or not.

In this approach the first angle can be represented, in this illustrative example with only eight possible angles, by a number between 0-3 and an extra flipfirst bit indicating whether the angle should be negated or not. The second angle is correspondingly represented by a number between 0-3 and an extra flipsecond bit indicating whether the angle should be negated or not.

Figure 12:
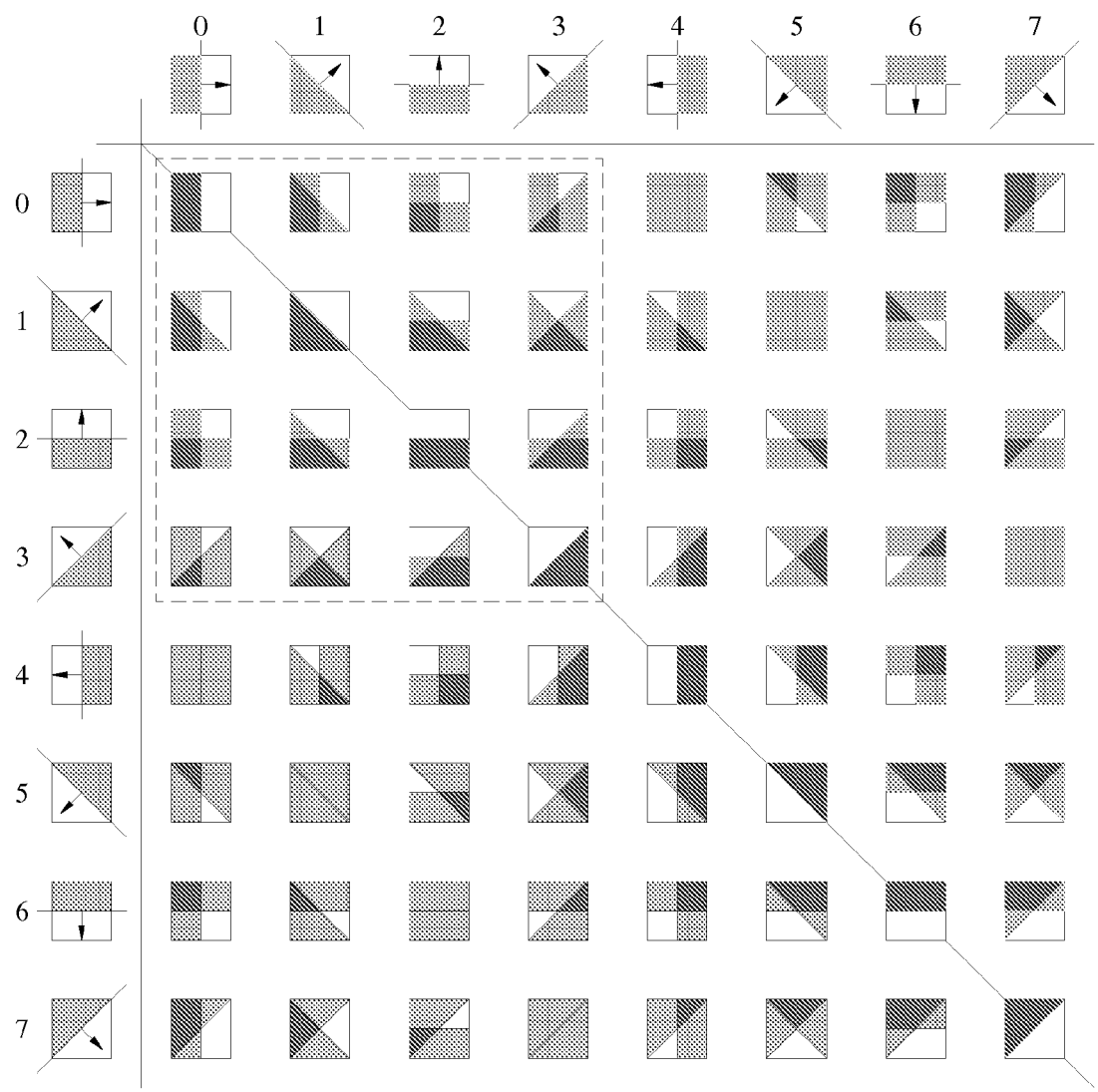
FIG. 12 is a drawing illustrating the concept of limiting the number of angles that are employed for defining a major direction in the texel block.

As a consequence, the distributions present in the upper left part of FIG. 12 enclosed by the hatched line will be used. Also within these distributions it is possible to use an ordering trick in order to signal one bit since the distributions above the diagonal in the hatched box are also found below the diagonal in the box. The flipfirst bit can therefore be signaled by selecting a distribution above or below the diagonal thereby saving one bit that can be used to spent on any of the other codewords in the compressed texel block.

An illustrative compression and decompression example follows below in order to illustrate this embodiment. Assume that the first angle should be 270 degrees (−90 degrees), i.e. angle number 6, whereas the second angle should be 0 degrees, i.e. angle number 0. These angle numbers are first converted into the range of 0-3 using flip bits. This corresponds to angle number 2 with the flipfirst bit equal to $1_{bin}$ for the first angle and angle number 0 with the flipsecond bit equal to $0_{bin}$ for the second angle. Thereafter it is investigated whether the positions of the bit codes for the first and second angle should be switched in the compressed texel block in order to indicate that we should be above the diagonal, i.e. first angle>second angle. In the present example no switching is necessary since the first angle number 2>the second angle number 0. Thus, in this example the first angle number should be 2 and the second angle number should be 0, which falls above the diagonal. However, we also want to signal that the flipfirst bit is $1_{bin}$. As a consequence, the two bit codes for the first and second angles are switched in the compressed texel block so that the first angle number becomes 0 and the second angle number becomes 2.

During decoding the decompressor retrieves the bit code for the first angle, the second angle and the flipsecond bit, which in the present examples are 0, 2 and $0_{bin}$ respectively. It is concluded that the first angle number 0<the second angle number 2, which indicates that the distribution is below the diagonal. The two angle numbers should therefore be switched so that the first angle number becomes 2 and the second angle number becomes 0. This "incorrect" relationship of the angle numbers requiring a switch further signals that the flipfirst bit is $1_{bin}$. The original angles can now be determined since an angle number of 2 together with a flip bit of $1_{bin}$ indicate that the first angle number should be 6 corresponding, in this example, to an angle of −90 or 270 degrees. Correspondingly, an angle number of 0 with a flip bit of $0_{bin}$ indicate that the second angle number should be 0 corresponding to an angle of 0 degrees.

Figure 13:
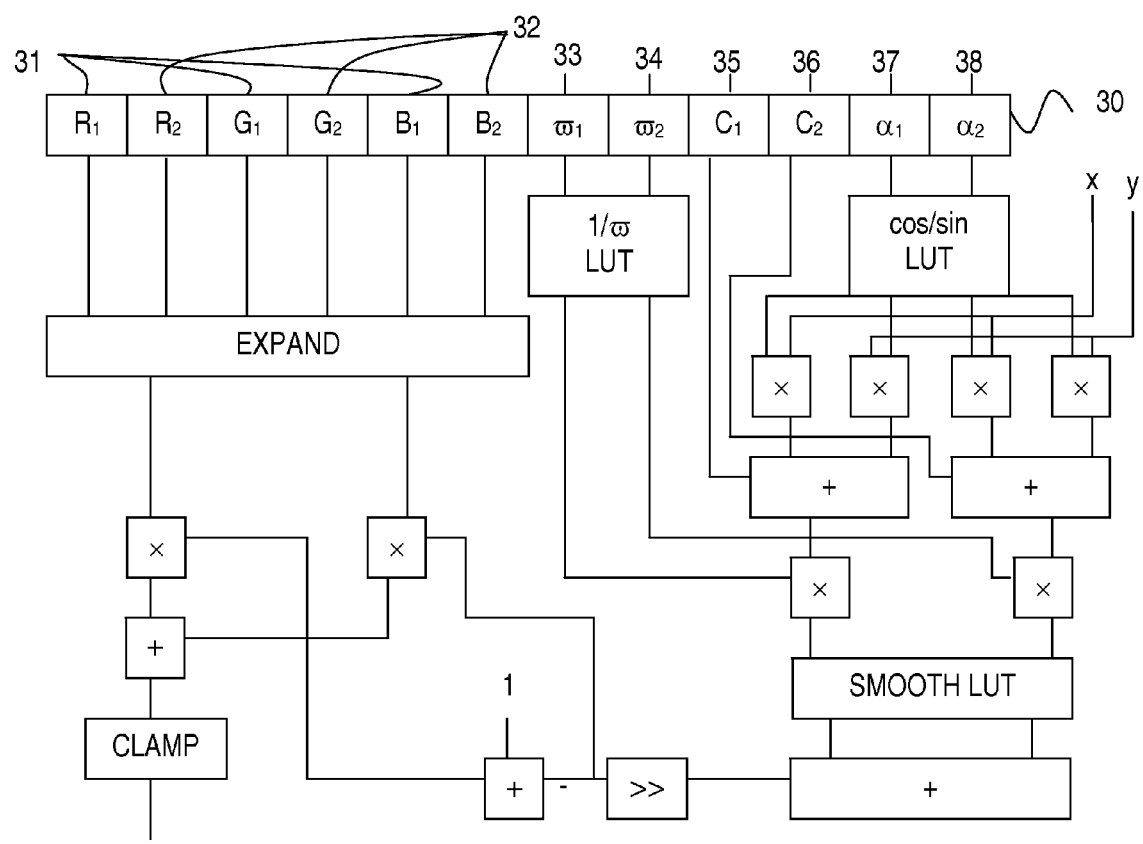
FIG. 13 is a hardware design example for the decompression unit.

In a non-limiting example and with reference to the upper part of FIG. 13, the compressed texel block 30 occupies 61 bits that can be distributed according to: 15 bits for the first value codeword 31, such as RGB555; 15 bits for the second value codeword 32; 8 bits for the function codeword 33, 34, such as 4 bits for defining the first function width 33 and 4 bits for defining the second function width 34; and remaining 23 bits for the line codewords 35-38, such as 6 bits for the first angle codeword 37, 6 bits for the second angle codeword 38 (or 5+6 bits with the above presented ordering trick saving one bit), 6 bits for the first translation codeword or parameter 35 and 5 bits for the second translation codeword or parameter 36 (or 6+6 bits with the above presented ordering trick saving one bit that can be used for boosting the second translation codeword 36). This should merely be seen as an illustrative example of total size for a compressed texel block 30 and an illustrative distribution of the total size among the included codewords 31-38. The compressed texel block 30 may optionally also comprise additional bits, such as at least one flip bit as previously discussed.

Decompression

The decompression is basically the inverse of the compression method and is conducted with the purpose of determining at least one value or representation of a texel in the texel block from the compressed texel block. The compressed texel block comprises the first and second value codewords, the line or direction codewords, the function codeword and optionally one or two flip bits.

Figure 7:
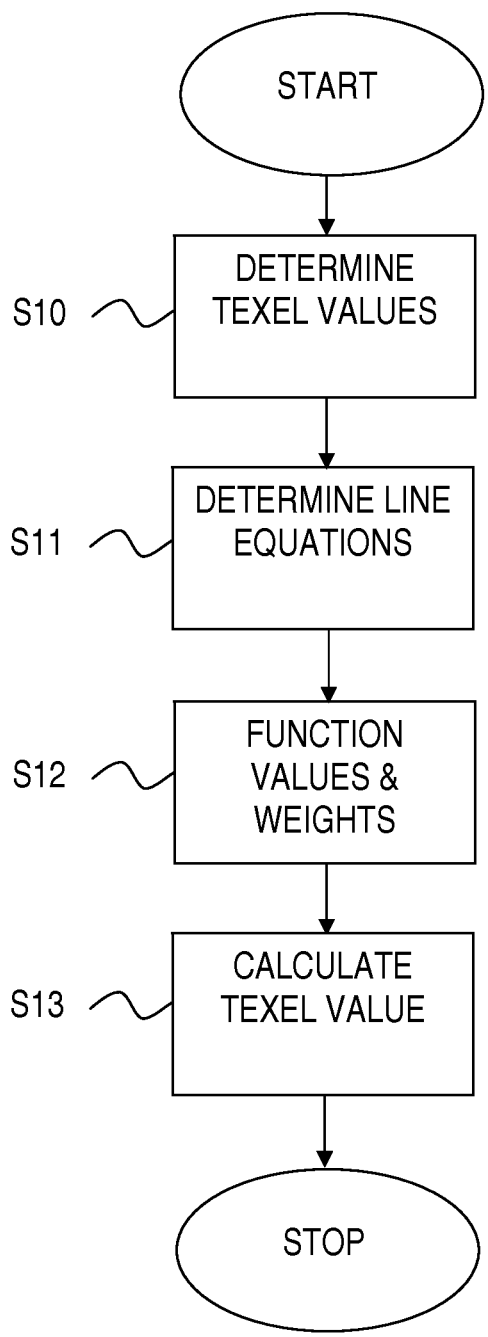
FIG. 7 illustrates a decompression method according to an embodiment.

FIG. 7 summaries the operations of the decompression method according to an embodiment.

The decompression generally starts by providing respective texel values from the two value codewords in the compressed texel block in step S10. In an embodiment the two value codewords can be used directly as texel values. Alternatively, they represent compressed versions of the two texel value and must first be expanded or extended into correct number of bits. For instance, a texel codeword in the format RGB555 can be expanded into RGB888, i.e. eight bits per color component, by copying the three most significant bits from the 5-bit color parameter to the three least significant bit positions to thereby get an expanded 8-bit color parameter.

A next step S11 determines the respective line equations for the two major directions in the texel block based on the line codewords. The line codewords preferably comprise one pair of translation parameters and one pair of angle parameters. The angle parameters are employed for deriving the parameters $A_i$ and $B_i$ in the line equations typically from cosine and sine functions. The calculation of cosine and sine value can be implemented as look-up tables as previously described. The result is the two line equations:

$$A_1 x + B_1 y + C_1 = 0$$

$$A_2 x + B_2 y + C_2 = 0$$

The particular functions to utilize for deriving the values that are employed for calculating the combined value and the color weights or indices are selected in step S12 based on the function codeword in the compressed texel block. This selection is preferably conducted by selecting the pair of symmetric single smooth-step functions that should be used based on the width parameters included in the function codeword. The two width parameters $\overline{\omega}_1$ and $\overline{\omega}_2$ thereby defines the two functions $f_1()$ and $f_2()$ that are employed for calculating the two values for the texel that should be decompressed.

The decompression then involves calculating the two respective values in step S12:

$$\text{value}_1(x,y) = f_1(A_1 x + B_1 y + C_1)$$

$$\text{value}_2(x,y) = f_2(A_2 x + B_2 y + C_2)$$

The combined value is then calculated in step S12 based on these two respective values. In an embodiment the combined value is calculated directly as $$\text{value\_combined}(x, y) = \text{value}_1(x, y) \times \text{value}_2(x, y) \text{ or}$$

$$\text{value\_combined}(x, y) = \frac{\text{value}_1(x, y) \times \text{value}_2(x, y)}{2},$$

or indeed some other combination of the two values.

In an alternative embodiment the compressed texel block comprises at least one flip bit as previously described. In such a case, it if first investigated whether any of the at least one flip bit is set. This investigation can be conducted according to the following pseudo-code:

```
if flipfirst==1
    new_value₁(x,y)=1−value₁(x,y)
else
    new_value₁(x,y)=value₁(x,y)
if flipsecond==1
    new_value₂(x,y)=1−value₂(x,y)
else
    new_value₂(x,y)=value₂(x,y)
```

Thus, if the flip bit is set for a direction, the new value determined for that direction is calculated in step S12 to be equal to one minus the value calculated for that direction according to above. If the flip bit is not set, the new value is determined to be equal to the calculated value.

The combined value is then determined based on the new values:

$$\text{value\_combined}(x, y) = \text{new\_value}_1(x, y) \times \text{new\_value}_2(x, y) \text{ or}$$

$$\text{value\_combined}(x, y) = \frac{\text{new\_value}_1(x, y) \times \text{new\_value}_2(x, y)}{2}.$$

As was previously discussed, the flip-half-plane bit can be used for both directions thereby achieving a potential update of both values if the respective flip-half-plane bits are set, corresponding to an original line angle larger than 180 degrees. In an alternative approach codeword swapping is employed or an ordering trick as discussed in connection with FIG. 12.

Finally the representations of texel value at texel position (x,y) in the texel block that is currently being decoded are calculated in step S13 from the previously provided value codewords or texel values derived from the value codewords and the weights calculated from the combined value calculated according to the embodiments described above:

$$\text{red\_value}(x,y) = w_1(x,y) \times R_1 + w_2(x,y) \times R_2$$

$$\text{green\_value}(x,y) = w_1(x,y) \times G_1 + w_2(x,y) \times G_2$$

$$\text{blue\_value}(x,y) = w_1(x,y) \times B_1 + w_2(x,y) \times B_2$$

wherein $R_1, G_1, B_1$ are the red, green and blue components of the first value codeword or texel value derived from the first value codeword, $R_2, G_2, B_2$ are the corresponding texel components of the second value codeword or the texel value derived from the second value codeword, $w_2(x,y)=$ value_combined(x,y) and $w_1(x,y)=1-$value_combined(x,y).

Implementation Example

Figure 8:
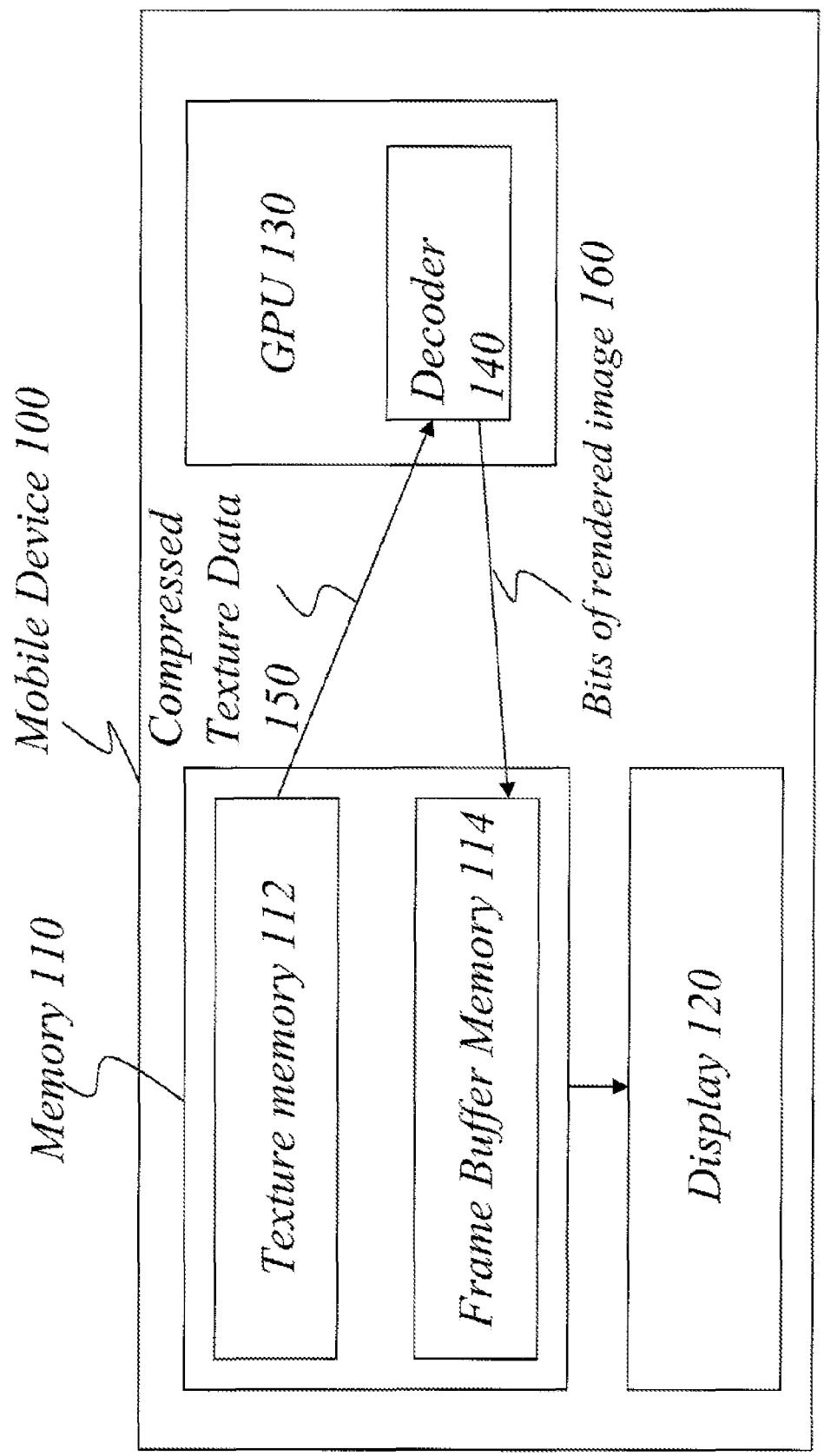
FIG. 8 is a schematic block diagram of a user terminal represented by a mobile device.

FIG. 8 illustrates schematically a mobile device 100 as a non-limiting example of user or media terminal with a GPU 130. Compressed images called textures are stored in an image memory 110 and bits of these compressed images 150 are transmitted from a texture memory 112 to the GPU 130 and then decoded by a decoder 140 of the GPU 130. The GPU 130 then uses the bits of decompressed textures to produce bits of a rendered image 160. These bits of the rendered image 160 are then sent back to a frame buffer memory 114 and then typically displayed at the display 120. The user terminal with the GPU 130 can be any media processing terminal or device including, for instance, computers, including laptops, game consoles, mobile telephones and other mobile processing units, such as personal digital assistants, iPad, mobile game consoles and other tablet computers.

Figure 9:
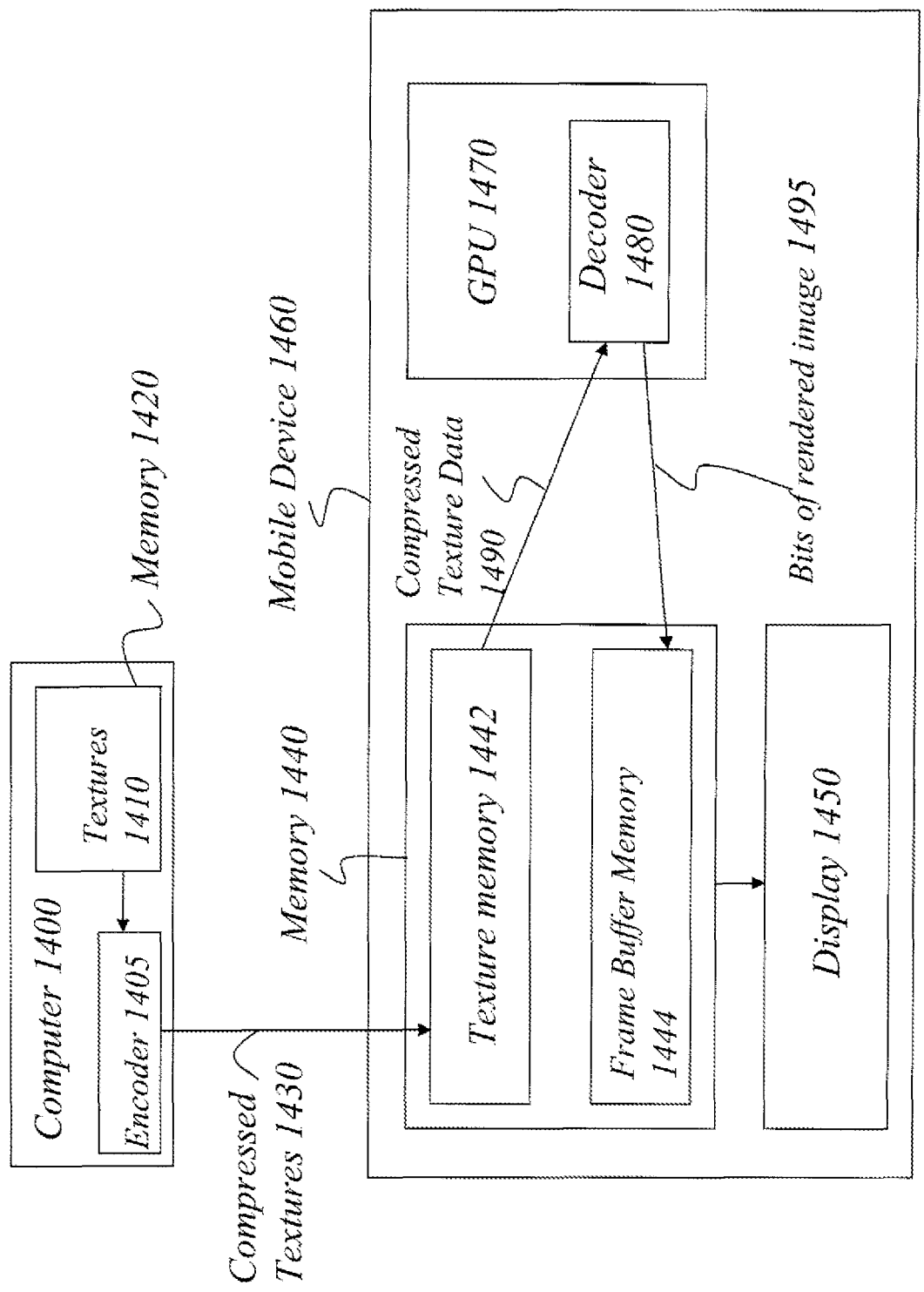
FIG. 9 illustrates an implementation example of an encoder and decoder according to an embodiment.

The above mentioned methods may be implemented in an encoder or compressor and decoder or decompressor as illustrated in FIG. 9. FIG. 9 illustrates schematically a mobile device or other user terminal 1460 with a GPU 1470 and an external computer 1400 with an encoder 1405 and a memory 1420 for storing textures. As explained in conjunction with FIG. 8, compressed images called textures received from the encoder 1405 are stored in a texture memory 1442 and bits of theses compressed images 1490 are transmitted over from the texture memory 1442 to the GPU 1470 and then decoded by a decoder 1480 of the GPU 1470. The GPU 1470 then uses the bits of decompressed textures to produce bits of a rendered image 1495. These bits of the rendered image are then sent back to a frame buffer memory 1444 and then displayed at the display 1450. The texture memory 1442 and the frame buffer memory 144 can be implemented together in a memory 1440 as illustrated in the figure.

It should be noted that the encoder 1405 performing the compression may be located in a computer 1440 external to the device wherein the compressed image is stored (e.g. in the mobile device 1460) or the compression may be performed by a CPU or a GPU 1470 of a device wherein the compressed image is stored, e.g. in the mobile device 1460.

Figure 10:
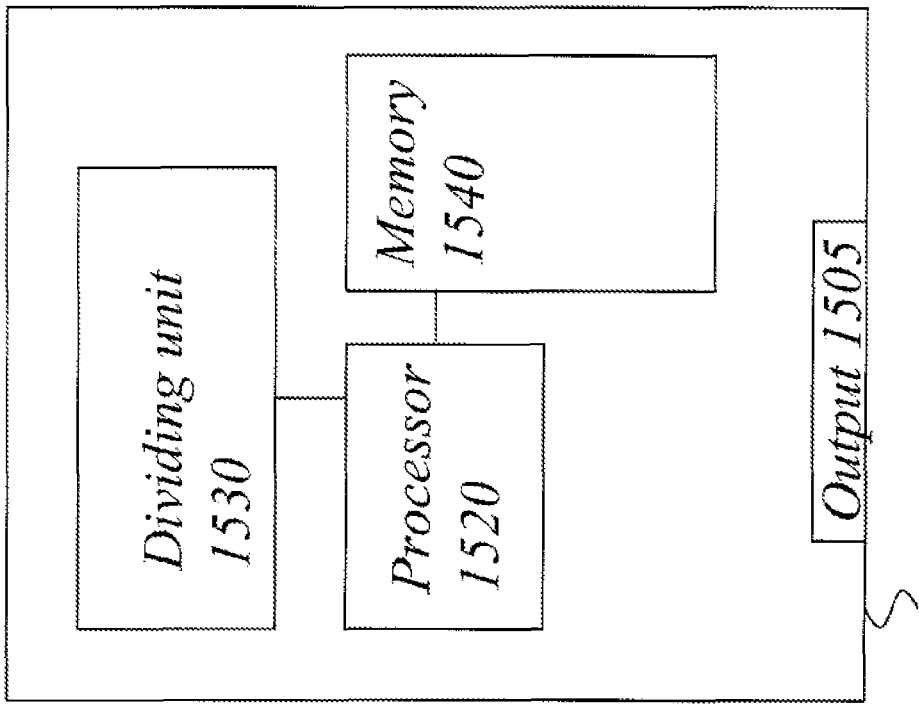
FIG. 10 is a schematic block diagram of an encoder according to an embodiment.

Accordingly, the encoder 1405 for compressing the block, as illustrated in FIG. 10, optionally comprises a dividing unit 1530 for dividing the image into a plurality of texel blocks, wherein each texel block comprises a number of texels and each texel has a value, here exemplified by a color value. Further, the encoder 1405 comprises further a processor 1520 configured to determine the two value codewords, the line codewords and the function codeword. A memory 1540 is also provided for storing the codewords and the parameters for the scalar valued function.

In particular the processor 1520 is configured to or comprises a value codeword determiner configured to determine, based on at least a portion of the texel values in the texel block, a first value codeword representing a first texel value and a second value codeword representing a second texel value. The processor 1520 is also configured to or comprises a line codeword determiner configured to determine, based on at least a portion of the texel values in the texel block, a first line codeword representing a first line for a first direction and a second line codeword representing a second line for a second direction. The processor 1520 is configured to or comprises a function codeword determiner configured to determine a function codeword representing a function that varies in two dimension and reflects a change in texel values when traveling along the first direction and the second direction in the texel block.

According to optional embodiments, the processor 1520 is further configured to evaluate a number of scalar-valued functions such as an arctan-function, a symmetric single asymmetric function, a asymmetriC_double_hook and a bilinear patch, and to select one of the evaluated scalar-valued functions which fulfils a predetermined condition.

Figure 11:
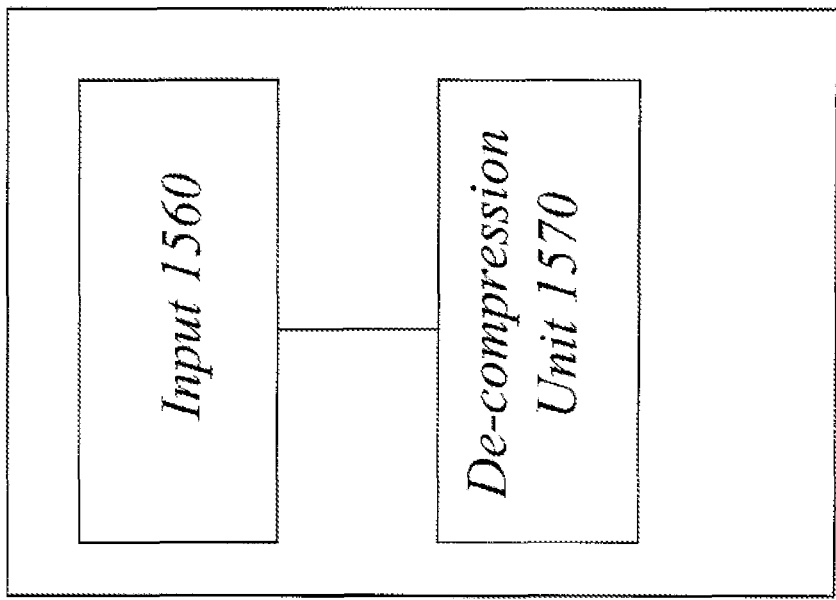
FIG. 11 is a schematic block diagram of a decoder according to an embodiment.

Turning to FIG. 11, a decoder 1480 according to embodiments is illustrated. The decoder 1480 comprises an input 1560 configured to receive the compressed texel block represented by a set of compressed data including the value codewords, the line codewords and the function codeword. The decoder further comprises a de-compression unit 1570 configured to use the scalar-valued function in conjunction with the received representations of the first and second value codewords and the parameters for the scalar valued function for de-compressing at least one texel of the texel block.

In a particular embodiment, the de-compression unit 1570 is configured to or comprises a value determiner configured to determine a first texel value based on a first value codeword comprised in the compressed texel block and a second texel value based on a second value codeword comprised in the compressed texel block. The de-compression unit 1570 is also configured to or comprises a line determiner configured to determine a first line equation of a first line for a first direction based on a first line codeword comprised in the compressed texel block and a second line equation of a second line for a second direction based on a second line codeword comprised in the compressed texel block. The decompression unit 1570 is further configured to or comprises a distance determiner configured to determine, for each texel in the texel block, a first signed distance between a position of the texel in the texel block and the first line and a second signed distance between the position of the texel in the texel block and the second line. The de-compression unit 1570 is configured to or comprises a value calculator configured to calculate, for each texel in the texel block, a first rescaled value as a first output of a function selected based on a function codeword comprises in the compressed texel block and with the first signed distance as input and a second rescaled value as a second output of the function and with the second signed distance as input. The function varies in two dimensions and reflects a change in texel values when traveling along the first direction and the second direction in the texel block. The de-compression unit 1570 is additionally configured to or comprises a weight definer configured to define, for each texel in the texel block, weights based on a combined value calculated based on the first rescaled value and the second rescaled value. The de-compression unit 1570 is also configured to or comprises a texel value calculator configured to calculate, for each texel in the texel block, a representation of a texel value of the texel based on a weighted combination of the first texel value and the second texel value using said calculated weights.

A particular hardware implementation of an embodiment of the de-compression unit is illustrated in FIG. 13. Firstly, the first and second value codewords 31, 32 represented as respective RGB-values in the figure are input to a value expander. The value expander expands or extends each color component of the value codewords 31, 32 into a defined number of bits, preferably 8 bits, by copying the most significant bits from respective color component to the least significant bit positions to reach the defined number of bits. For instance, input RGB555 value codewords 31, 32 can be expanded into RGB888 texel values. This value expander corresponds to the previous mentioned value determiner.

The two angle codewords 37, 38 of the line codewords 35-38 are preferably input to a cos/sin look-up table (LUT) to output the corresponding cosine and sine values $A_1=\cos(\alpha_1)$, $B_1=\sin(\alpha_1)$ and $A_2=\cos(\alpha_2)$, $B_2=\sin(\alpha_2)$. The outputs from the cos/sin LUT are multiplied by the position or coordinate (x,y) of a texel of the texel block to be compressed in order to get $A_1x$, $B_1y$, $A_2x$ and $B_2y$ in respective multipliers. The outputs from the two first multipliers relating to the first line are added by an adder to the first translation parameter $C_1$ 35 to get the first signed distance $d_1=A_1x+B_1y+C_1$. A second adder correspondingly adds the outputs from the multipliers relating to the second line to the second translation parameter $C_2$ 36 to get the second signed distance $d_2=A_2x+B_2y+C_2=0$. The cos/sin LUT corresponds to the line determiner with the adders and multipliers corresponding to the distance determiner.

The function codeword 33, 34 comprising the two width parameters 33, 34 is input to an $1/\varpi$ LUT, which outputs the precalculated values $1/\varpi_1$ and $1/\varpi_2$. The first LUT output is multiplied to the first signed distance to get $d_1/\varpi_1$ and the second LUT output is correspondingly multiplied to the second signed distance to get $d_2/\varpi_2$. These two multiplier outputs are input to a smooth LUT that lists predefined values of the symmetric single smooth-step function $f=3s^2-2s^3$, where $$s = \frac{d_i}{\varpi_i} + 0.5, i = 1, 2.$$

The $1/\varpi$ LUT, the smooth LUT and the two adders correspond to the value calculator.

The two smooth LUT outputs are added in an adder and divided by two in order to get a combined value as an average of the two values. This combined value is employed as a weight to be multiplied by the second texel value from the expander. The second weight is calculated as one subtracted by the combined value in an adder and is multiplied with the first texel value. The adders and bit shifter, employed to achieve division by two, correspond to the weight determiner. The weighted texel values are then added together and then preferably clamped within an allowed range, such as 0-255 for an RGB888 texel value. The multipliers, final adder and the optional clamper correspond to the texel value calculator.

The above described hardware implementation should merely be seen as an illustrative and non-limiting implementation example for the de-compression unit. Other circuitry performing similar functions could alternatively be employed and are within scope of the embodiments.

Any of the embodiments of the encoder and the decoder could be implemented at least partly in software. The encoder or decoder is then implemented as a computer program product stored on a memory and loaded and run on a general purpose or specially adapted computer, processor or microprocessor, such as a central processing unit (CPU).

The software includes computer program code elements or software code portions effectuating the operation of at least the processor in FIG. 10 or the de-compression unit in FIG. 11. The units or devices as illustrated in FIGS. 10 and 11 may also be implemented as computer program code elements stored in the memory and executed by the CPU. The program may be stored in whole or part, on or in one or more suitable volatile computer readable media or data storage means, such as RAM, or one or more non-volatile computer readable media or data storage means, such as magnetic disks, CD-ROMs, DVD disks, hard discs, in ROM or flash memory. The data storage means can be a local data storage means or is remotely provided, such as in a data server. The software may thus be loaded into the operating memory of a computer or equivalent processing system for execution by a processor. The computer/processor does not have to be dedicated to only execute the above-described functions but may also execute other software tasks.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible.

The invention claimed is:

1. A method of compressing a texel block comprising multiple texels each having a respective texel value, said method comprising:
   determining, based on at least a portion of texel values of said multiple texels, a first value codeword representing a first texel value and a second value codeword representing a second texel value;
   determining, based on at least a portion of said texel values of said multiple texels, a first line codeword representing a first line for a first direction and a second line codeword representing a second line for a second direction;
   determining a function codeword representing a function that varies in two dimensions and reflects a change in texel values when traveling along said first direction and said second direction in said texel block; and
   storing, in a memory, a compressed texel block as a compressed representation of said texel block, said compressed texel block comprises said first value codeword, said second value codeword, said first line codeword, said second line codeword and said function codeword,
   wherein determining said first line codeword and said second line codeword comprises:
      determining said first line codeword to comprise a first angle codeword representing an angle $\alpha_1$ of said first line relative a fixed direction and a first translation codeword representing a translation parameter $C_1$, wherein $A_1=\cos(\alpha_1)$ and $B_1=\sin(\alpha_1)$ and said first line is defined as $A_1x+B_1y+C_1=0$ and $A_1^2+B_1^2=1$; and
      determining said second line codeword to comprise a second angle codeword representing an angle $\alpha_2$ of said second line relative said fixed direction and a second translation codeword representing a translation parameter $C_2$,
   wherein $A_2=\cos(\alpha_2)$ and $B_2=\sin(\alpha_2)$ and said second line is defined as $A_2x+B_2y+C_2=0$ and $A_2^2+B_2^2 1$.

2. The method according to claim 1, wherein determining said first line codeword and said second line codeword comprises:
   determining, based on said at least a portion of said texel values of said multiple texels, said first direction and said second direction as directions along which said texel values of said multiple texels have largest variation;
   fitting said first line to said first direction and said second line to said second direction; and
   determining said first line codeword to define parameters required to represent said first line and said second line codeword to define parameters required to represent said second line.

3. The method according to claim 1, further comprising:

updating, if said first angle parameter $\alpha_1$ is larger than 180 degrees, said first angle parameter as $\alpha_1=\alpha_1-180$;

updating, if said second angle parameter $\alpha_2$ is larger than 180 degrees, said second angle parameter as $\alpha_2=\alpha_2-180$;

setting, if said first angle parameter $\alpha_1$ is larger than 180 degrees, a first flip bit to $1_{bin}$ otherwise setting said first flip bit to $0_{bin}$; and setting, if said second angle parameter $\alpha_2$ is larger than 180 degrees, a second flip bit to $1_{bin}$ otherwise setting said second flip bit to $0_{bin}$, wherein storing said compressed texel block comprises storing, in said memory, said compressed texel block comprising said first value codeword, said second value codeword, said first line codeword, said second line codeword, said function codeword, said first flip bit and said second flip bit.

4. The method according to claim 1, further comprising:

updating, if said first angle parameter $\alpha_1$ is larger than 180 degrees, said first angle parameter as $\alpha_1=\alpha_1-180$;

updating, if said second angle parameter $\alpha_2$ is larger than 180 degrees, said second angle parameter as $\alpha_2=\alpha_2-180$;

setting, if said second angle parameter $\alpha_2$ is larger than 180 degrees, a flipsecond bit to $1_{bin}$ otherwise setting said flipsecond bit to $0_{bin}$, swapping, if said first angle parameter $\alpha_1$ is larger than 180 degrees and if said first angle parameter $\alpha_1$ is larger than said second angle parameter $\alpha_2$, positions of said first angle parameter $\alpha_1$ and second angle parameter $\alpha_2$ in said compressed texel block; and swapping, if said first angle parameter $\alpha_1$ is not larger than 180 degrees and if said first angle parameter $\alpha_1$ is smaller than said second angle parameter $\alpha_2$, positions of said first angle parameter $\alpha_1$ and second angle parameter $\alpha_2$ in said compressed texel block, wherein storing said compressed texel block comprises storing, in said memory, said compressed texel block comprising said first value codeword, said second value codeword, said first line codeword, said second line codeword, said function codeword and said flipsecond bit.

5. The method according to claim 1, wherein determining said function codeword comprises determining said function codeword representing a first symmetric single smooth-step function that varies in one dimension and reflects a change in texel values when traveling along said first direction in said texel block and a second symmetric smooth-step function that varies in one dimension and reflects a change in texel value when traveling along said second direction in said texel block.

6. The method according to claim 5, wherein determining said function codeword comprises determining a first width parameter $\overline{\omega}_1$ (33) defining said first symmetric single smooth-step function $f_1(d)$ and a second width parameter $\overline{\omega}_2$ defining said second symmetric single smooth-step function $f_2(d)$, wherein $f_i(d)=3s^2-2s^3$, where $$s = \frac{d}{\overline{\omega}_i} + 0.5$$

with the proviso that if s<0 then s=0 and if s>1 then s=1 and i=1,2.

7. An encoder for compressing a texel block comprising multiple texels each having a respective texel value, said encoder comprising:

a processor configured to determine, based on at least a portion of texel values of said multiple texels, a first value codeword representing a first texel value and a second value codeword representing a second texel value;

determine, based on at least a portion of said texel values of said multiple texels, a first line codeword representing a first line for a first direction and a second line codeword representing a second line for a second direction; and determine a function codeword representing a function that varies in two dimensions and reflects a change in texel values when traveling along said first direction and said second direction in said texel block; and a memory configured to store a compressed texel block as a compressed representation of said texel block, said compressed texel block comprises said first value codeword, said second value codeword, said first line codeword, said second line codeword, and said function codeword, wherein said processor is configured to:

determine said first line codeword to comprise a first angle codeword representing an angle $\alpha_1$ of said first line relative a fixed direction and a first translation codeword representing a translation parameter $C_1$, wherein $A_1=\cos(\alpha_1)$ and $B_1=\sin(\alpha_1)$ and said first line is defined as $A_1x+B_1y+C_1=0$ and $A_1^2+B_1^2=1$; and determine said second line codeword to comprise a second angle codeword representing an angle $\alpha_2$ of said second line relative said fixed direction and a second translation codeword representing a translation parameter $C_2$, wherein $A_2=\cos(\alpha_2)$ and $B_2=\sin(\alpha_2)$ and said second line is defined as $A_2x+B_2y+C_2=0$ and $A_2^2+B_2^2=1$.

8. The encoder according to claim 7, wherein said processor is configured to determine, based on said at least a portion of said texel values of said multiple texels, said first direction and said second direction as directions along which said texel values of said multiple texels have largest variation;

fit said first line to said first direction and said second line to said second direction; and determine said first line codeword to define parameters required to represent said first line and said second line codeword to define parameters required to represent said second line.

9. The encoder according to claim 7, wherein said processor is configured to update, if said first angle parameter $\alpha_1$ is larger than 180 degrees, said first angle parameter as $\alpha_1=\alpha_1-180$;

update, if said second angle parameter $\alpha_2$ is larger than 180 degrees, said second angle parameter as $\alpha_2=\alpha_2-180$;

set, if said first angle parameter $\alpha_1$ is larger than 180 degrees, a first flip bit to $1_{bin}$ otherwise setting said first flip bit to $0_{bin}$; and set, if said second angle parameter $\alpha_2$ is larger than 180 degrees, a second flip bit to $1_{bin}$ otherwise setting said second flip bit to $0_{bin}$, and said memory is configured to store said compressed texel block comprising said first value codeword, said second value codeword, said first line codeword, said second line codeword, said function codeword, said first flip bit and said second flip bit.

10. The encoder according to claim 7, wherein said processor is configured to update, if said first angle parameter $\alpha_1$ is larger than 180 degrees, said first angle parameter as $\alpha_1=\alpha_1-180$;

update, if said second angle parameter $\alpha_2$ is larger than 180 degrees, said second angle parameter as $\alpha_2=\alpha_2-180$;

set, if said second angle parameter $\alpha_2$ is larger than 180 degrees, a flipsecond bit to $1_{bin}$ otherwise setting said flipsecond bit to $0_{bin}$, swap, if said first angle parameter $\alpha_1$ is larger than 180 degrees and if said first angle parameter $\alpha_1$ is larger than said second angle parameter $\alpha_2$, positions of said first angle parameter $\alpha_1$ and second angle parameter $\alpha_2$ in said compressed texel block; and swap, if said first angle parameter $\alpha_1$ is not larger than 180 degrees and if said first angle parameter $\alpha_1$ is smaller than said second angle parameter $\alpha_2$, positions of said first angle parameter $\alpha_1$ and second angle parameter $\alpha_2$ in said compressed texel block, and said memory is configured to store said compressed texel block comprising said first value codeword, said second value codeword, said first line codeword, said second line codeword, said function codeword and said flipsecond bit.

11. The encoder according to claim 7, wherein said processor is configured to determine said function codeword to represent a first symmetric single smooth-step function that varies in one dimension and reflects a change in texel values when traveling along said first direction in said texel block and a second symmetric smooth-step function that varies in one dimension and reflects a change in texel value when traveling along said second direction in said texel block.

12. The encoder according to claim 11, wherein said processor is configured to determine a first width parameter $\overline{\omega}_1$ defining said first symmetric single smooth-step function $f_1(d)$ and a second width parameter $\overline{\omega}_2$ defining said second symmetric single smooth-step function $f_2(d)$, wherein $f_i(d)=3s^2-2s^3$, where $$s = \frac{d}{\varpi_i} + 0.5$$

with the proviso that if s<0 then s=0 and if s>1 then s=1 and i=1,2.

13. A computer comprising an encoder according to claim 7.

14. A method of decompressing a compressed texel block that is a compressed representation of a texel block comprising multiple texels each having a respective texel value, said method comprising:

determining a first texel value based on a first value codeword comprised in said compressed texel block and a second texel value based on a second value codeword comprised in said compressed texel block;

determining a first line equation of a first line for a first direction based on a first line codeword comprised in said compressed texel block and a second line equation of a second line for a second direction based on a second line codeword comprised in said compressed texel block;

determining, for each texel of said multiple texels, a first signed distance between a position of said texel in said texel block and said first line and a second signed distance between said position of said texel in said texel block and said second line;

calculating, for each texel of said multiple texels, a first rescaled value as a first output of a function selected based on a function codeword comprises in said compressed texel block and with said first signed distance as input and a second rescaled value as a second output of said function and with said second signed distance as input, said function varies in two dimensions and reflects a change in texel values when traveling along said first direction and said second direction in said texel block;

defining, for each texel of said multiple texels, weights based on a combined value calculated based on said first rescaled value and said second rescaled value; and calculating, for each texel of said multiple texels, a representation of a texel value of said texel based on a weighted combination of said first texel value and said second texel value using said calculated weights, wherein determining said first line equation and said second line equation comprises:

determining said first line equation as $A_1x+B_1y+C_1=0$ based on a first angle codeword of said first line codeword representing an angle $\alpha_1$ of said first line relative a fixed direction and a first translation codeword of said first line codeword representing a translation parameter $C_1$, wherein $A_1=\cos(\alpha_1)$ and $B_1=\sin(\alpha_1)$ and $A_1^2+B_1^2=1$; and determining said second line equation as $A_2x+B_2y+C_2=0$ based on a second angle codeword of said second line codeword representing an angle $\alpha_2$ of said second line relative said fixed direction and a second translation codeword of said second line codeword representing a translation parameter $C_2$, wherein $A_2=\cos(\alpha_2)$ and $B_2=\sin(\alpha_2)$ and $A_2^2+B_2^2=1$.

15. The method according to claim 14, wherein determining said first signed distance and said second signed distance comprises:

determining, for each texel of said multiple texels, said first signed distance as $d_1(p_x,p_y)=A_1p_x+B_1p_y+C_1$, wherein $(p_x,p_y)$ represents said position of said texel in said texel block; and determining, for each texel of said multiple texels, said second signed distance as $d_2(p_x,p_y)=A_2p_x+B_2p_y+C_2$.

16. The method according to claim 14, wherein calculating said first rescaled value and said second rescaled value comprises:

calculating, for each texel of said multiple texels, said first rescaled value as $f_1(d_1)=3s^2-2s^3$, where $$s = \frac{d_1}{\varpi_1} + 0.5$$

with the proviso that if s<0 then s=0 and if s>1 then s=1 and $\overline{\omega}_1$ is a first width parameter of said function codeword and defines a first symmetric single smooth-step function $f_1(d_1)$ and $d_1$ represents said first signed distance; and calculating, for each texel of said multiple texels, said first rescaled value as $f_2(d_2)=3s^2-2s^3$, where $$s = \frac{d_2}{\varpi_2} + 0.5$$

with the proviso that if s<0 then s=0 and if s>1 then s=1 and $\overline{\omega}_2$ is a second width parameter of said function codeword and defines a second symmetric single smooth-step function $f_2(d_2)$ and $d_2$ represents said second signed distance, said function varying in two dimensions consists of said first symmetric single smooth-step function and said second symmetric single smooth-step function.

17. The method according to claim 15, wherein calculating said representation of said texel value comprises calculating, for each texel of said multiple texels, said representation of said texel value of said texel as $(1-w_2(x,y)) \times P_1 + w_2(x,y) \times P_2$, wherein $w_2(x,y)$ represents said combined value, $(x,y)$ represents a position of said texel in said texel block, $P_1$ represents said first texel value and $P_2$ represents said second texel value.

18. The method according to claim 14, further comprising:
calculating said combined value as an average or product of said first rescaled value and said second rescaled value if a flipfirst bit in said compressed texel block is equal to $0_{bin}$ and a flipsecond bit in said compressed texel block is equal to $0_{bin}$;
calculating said combined value as an average or product of one minus said first rescaled value and said second rescaled value if a flipfirst bit in said compressed texel block is equal to $1_{bin}$ and a flipsecond bit in said compressed texel block is equal to $0_{bin}$;
calculating said combined value as an average or product of said first rescaled value and one minus said second rescaled value if a flipfirst bit in said compressed texel block is equal to $0_{bin}$ and a flipsecond bit in said compressed texel block is equal to $1_{bin}$; and
calculating said combined value as an average or product of one minus said first rescaled value and one minus said second rescaled value if a flipfirst bit in said compressed texel block is equal to $1_{bin}$ and a flipsecond bit in said compressed texel block is equal to $1_{bin}$.

19. A decoder for decompressing a compressed texel block that is a compressed representation of a texel block comprising multiple texels each having a respective texel value, said decoder being configured to:
determine a first texel value based on a first value codeword comprised in said compressed texel block and a second texel value based on a second value codeword comprised in said compressed texel block;
determine a first line equation of a first line for a first direction based on a first line codeword comprised in said compressed texel block and a second line equation of a second line for a second direction based on a second line codeword comprised in said compressed texel block;
determine, for each texel of said multiple texels, a first signed distance between a position of said texel in said texel block and said first line and a second signed distance between said position of said texel in said texel block and said second line;
calculate, for each texel of said multiple texels, a first rescaled value as a first output of a function selected based on a function codeword comprises in said compressed texel block and with said first signed distance as input and a second rescaled value as a second output of said function and with said second signed distance as input, said function varies in two dimensions and reflects a change in texel values when traveling along said first direction and said second direction in said texel block;
define, for each texel of said multiple texels, weights based on a combined value calculated based on said first rescaled value and said second rescaled value;
calculate, for each texel of said multiple texels, a representation of a texel value of said texel based on a weighted combination of said first texel value and said second texel value using said calculated weights;
determine said first line equation as $A_1x+B_1y+C_1=0$ based on a first angle codeword of said first line codeword representing an angle $\alpha_1$ of said first line relative a fixed direction and a first translation codeword of said first line codeword representing a translation parameter $C_1$, wherein $A_1=\cos(\alpha_1)$ and $B_1=\sin(\alpha_1)$ and $A_1^2+B_1^2=1$; and
determine said line equation as $A_2x+B_2y+C_2=0$ based on a second angle codeword of said second line codeword representing an angle $\alpha_2$ of said second line relative said fixed direction and a second translation codeword of said second line codeword representing a translation parameter $C_2$, wherein $A_2=\cos(\alpha_2)$ and $B_2=\sin(\alpha_2)$ and $A_2^2+B_2^2=1$.

20. The decoder according to claim 19, wherein said decoder is configured to:
determine, for each texel of said multiple texels, said first signed distance as $d_1(p_x,p_y)=A_1p_x+B_1p_y+C_1$, wherein $(p_x,p_y)$ represents said position of said texel in said texel block (10); and
determine, for each texel of said multiple texels, said second signed distance as $d_2(p_x,p_y)=A_2p_x+B_2p_y+C_2$.

21. The decoder according to claim 19, wherein said decoder is configured to:
calculate, for each texel of said multiple texels, said first rescaled value as $f_1(d_1)=3s^2-2s^3$, where $$s = \frac{d_1}{\varpi_1} + 0.5$$

with the proviso that if $s<0$ then $s=0$ and if $s>1$ then $s=1$ and $\varpi_1$ is a first width parameter of said function codeword and defines a first symmetric single smooth-step function $f_1(d_1)$ and $d_1$ represents said first signed distance; and
calculate, for each texel of said multiple texels, said first rescaled value as $f_2(d_2)=3s^2-2s^3$, where $$s = \frac{d_2}{\varpi_2} + 0.5$$

with the proviso that if $s<0$ then $s=0$ and if $s>1$ then $s=1$ and $\varpi_2$ is a second width parameter of said function codeword and defines a second symmetric single smooth-step function $f_2(d_2)$ and $d_2$ represents said second signed distance, said function varying in two dimensions consists of said first symmetric single smooth-step function and said second symmetric single smooth-step function.

22. The decoder according to claim 19, wherein said decoder is configured to calculate, for each texel of said multiple texels, said representation of said texel value of said texel as $(1-w_2(x,y)) \times P_1 + w_2(x,y) \times P_2$, wherein $w_2(x,y)$ represents said combined value, $(x,y)$ represents a position of said texel in said texel block $P_1$ represents said first texel value and $P_2$ represents said second texel value.

23. The decoder according to claim 19, wherein said decoder is configured to:
calculate said combined value as an average or product of said first rescaled value and said second rescaled value if a flipfirst bit in said compressed texel block is equal to $0_{bin}$ and a flipsecond bit in said compressed texel block is equal to $0_{bin}$;
calculate said combined value as an average or product of one minus said first rescaled value and said second rescaled value if a flipfirst bit in said compressed texel block is equal to $1_{bin}$ and a flipsecond bit in said compressed texel block is equal to $0_{bin}$;
calculate said combined value as an average or product of said first rescaled value and one minus said second rescaled value if a flipfirst bit in said compressed texel block is equal to $0_{bin}$ and a flipsecond bit in said compressed texel block is equal to $1_{bin}$; and calculate said combined value as an average or product of one minus said first rescaled value and one minus said second rescaled value if a flipfirst bit in said compressed texel block is equal to $1_{bin}$ and a flipsecond bit in said compressed texel block is equal to $1_{bin}$.

24. A user terminal comprising a graphical processing unit having a decoder according to claim 19.

* * * * *